(12) United States Patent
Sidebottom

(10) Patent No.: US 6,694,635 B1
(45) Date of Patent: Feb. 24, 2004

(54) ROUTER TEMPLATE APPARATUS

(76) Inventor: Laurence R. Sidebottom, 2585 Steiner Rd., Comins, MI (US) 48619

( * ) Notice: Subject to any disclaimer, the term of this patent is extended or adjusted under 35 U.S.C. 154(b) by 0 days.

(21) Appl. No.: 10/164,815

(22) Filed: Jun. 7, 2002

(51) Int. Cl.$^7$ ................................................ B23Q 17/22
(52) U.S. Cl. .......................... 33/638; 33/423; 33/456; 33/628; 33/644
(58) Field of Search ........................... 33/638, 418, 423, 33/424, 452, 456, 465, 471, 484, 485, 520, 528, 626, 628, 644, 562

(56) References Cited

U.S. PATENT DOCUMENTS

| | | |
|---|---|---|
| 831,204 A | 9/1906 | Woolf |
| 1,615,509 A * | 1/1927 | Grotendorst ................. 33/471 |
| 2,773,523 A * | 12/1956 | Hopla .......................... 33/403 |
| 2,957,507 A * | 10/1960 | Vargo .......................... 33/452 |
| 3,540,130 A * | 11/1970 | French ......................... 33/562 |
| 3,726,327 A | 4/1973 | Cormier |
| 3,985,168 A | 10/1976 | Lundquist |
| 4,285,135 A * | 8/1981 | Minozzi, Jr. ................. 33/528 |
| 4,358,896 A * | 11/1982 | Thomas ........................ 33/644 |
| 4,605,048 A | 8/1986 | Swartout et al. |
| 4,630,657 A * | 12/1986 | Obradovich ........... 144/144.52 |
| 4,742,853 A * | 5/1988 | Davison ....................... 33/562 |
| 4,769,920 A | 9/1988 | O'Connor, Jr. |
| 5,052,454 A * | 10/1991 | Meinhardt ............. 144/144.51 |
| 5,148,730 A * | 9/1992 | McCaw ....................... 33/465 |
| D337,502 S | 7/1993 | Witt |
| 5,472,029 A * | 12/1995 | Ketch .......................... 33/418 |
| 5,533,556 A * | 7/1996 | Whitney ................ 144/144.52 |
| 6,039,095 A * | 3/2000 | Newman ............... 144/144.52 |
| 6,134,797 A * | 10/2000 | Boyce .......................... 33/464 |
| 6,176,281 B1 * | 1/2001 | Newman ...................... 33/638 |
| 6,305,449 B1 * | 10/2001 | Stover ......................... 144/371 |

* cited by examiner

Primary Examiner—Diego Gutierrez
Assistant Examiner—Yaritza Guadalupe

(57) ABSTRACT

A router template apparatus for routing stair stringers to accept end sections of stair members to facilitate building a stairway. The router template apparatus includes a rectangular frame member that has an opening extending therethrough for receiving a router. The frame member comprises a pair of elongate side portions and a pair of elongate end portions. A pair of brace members is pivotally coupled to opposing corner portions of the frame member. Each of the brace members is oriented generally parallel to each other when attached to the frame member. When inside edges of the brace members are positioned adjacent to side edges of a stair stringer and the frame member is positioned atop a broad surface of the stringer, the opening guides the router to facilitate cutting out a recessed section in the stringer such that an end portion of a stair member is positionable in the recessed section to facilitate building a stairway.

13 Claims, 4 Drawing Sheets

ROUTER TEMPLATE APPARATUS

BACKGROUND OF THE INVENTION

1. Field of the Invention

The present invention relates to router templates and more particularly pertains to a new router template apparatus for routing stair stringers to accept end sections of stair members to facilitate building a stairway.

2. Description of the Prior Art

The use of router templates is known in the prior art. U.S. Pat. No. 4,769,920 describes an apparatus for guiding a router to cut grooves for stair treads and the like. Another type of router template is U.S. Pat. No. 4,605,048 which discloses a stair step routing template.

While these devices fulfill their respective, particular objectives and requirements, the need remains for a device that is more simplistic in design and use.

SUMMARY OF THE INVENTION

The present invention meets the needs presented above by incorporating a template for guiding the router that utilizes angle indicia precisely positioned with relation to a pivot point allowing the user to simply place the device, secure it to the stringer, and cut out the section for the step member.

Still yet another object of the present invention is to provide a new router template apparatus that is adjustable to accommodate a variety of sizes of stringers.

Even still another object of the present invention is to provide a new router template apparatus that is universal with regards to adapting to the rise and run ratio of the stairway being built through the use the angle indicia on the template.

To this end, the present invention generally comprises a rectangular frame member that has an opening extending therethrough for receiving a router. The frame member comprises a pair of elongate side portions and a pair of elongate end portions.

A pair of brace members is pivotally coupled to opposing corner portions of the frame member. Each of the brace members is oriented generally parallel to each other when attached to the frame member.

When inside edges of the brace members are positioned adjacent to side edges of a stair stringer and the frame member is positioned atop a broad surface of the stringer, the opening guides the router to facilitate cutting out a recessed section in the stringer such that an end portion of a stair member is positionable in the recessed section to facilitate building a stairway.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
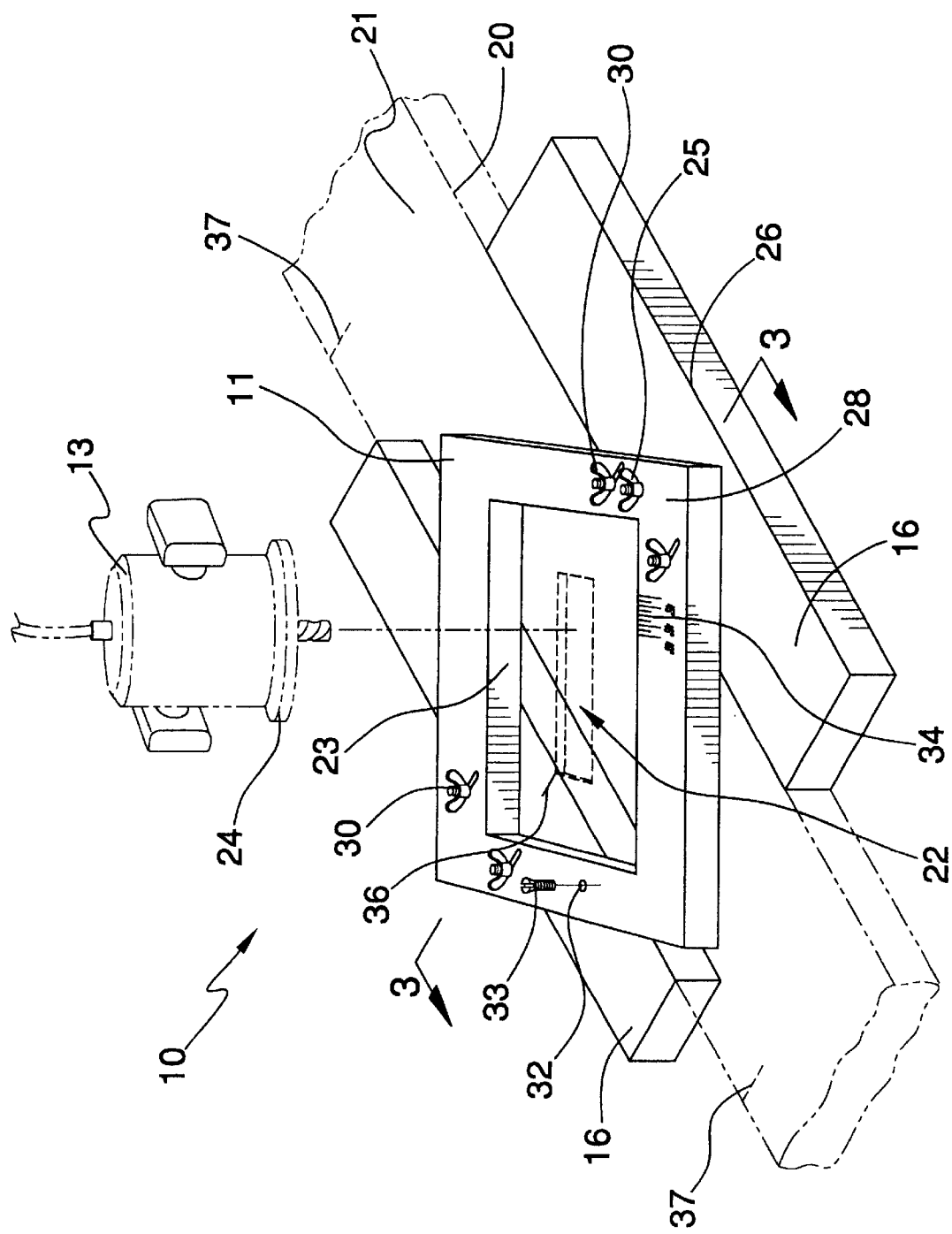
FIG. 1 is a schematic perspective view of a new router template apparatus according to the present invention.
Figure 2:
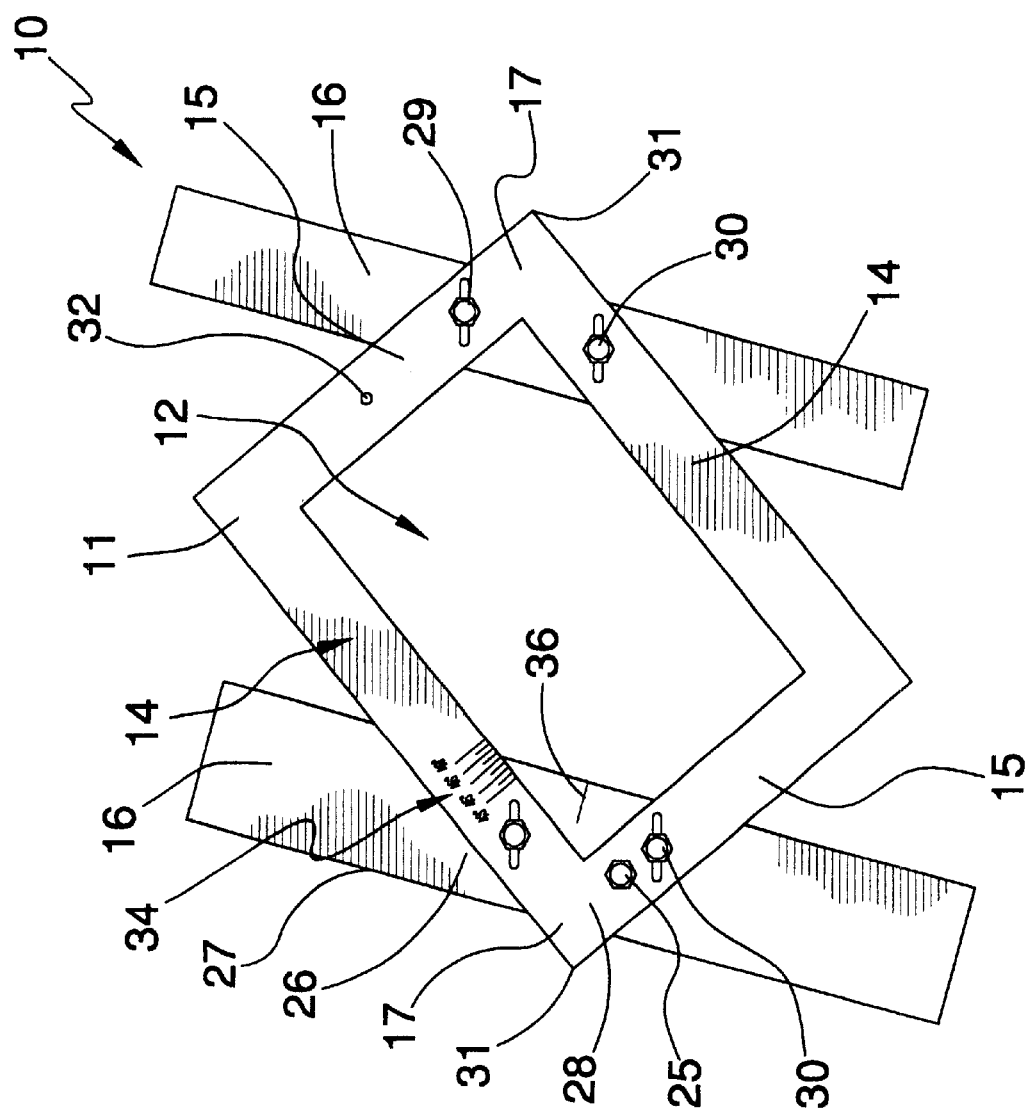
FIG. 2 is a schematic top view of the present invention.
Figure 3:
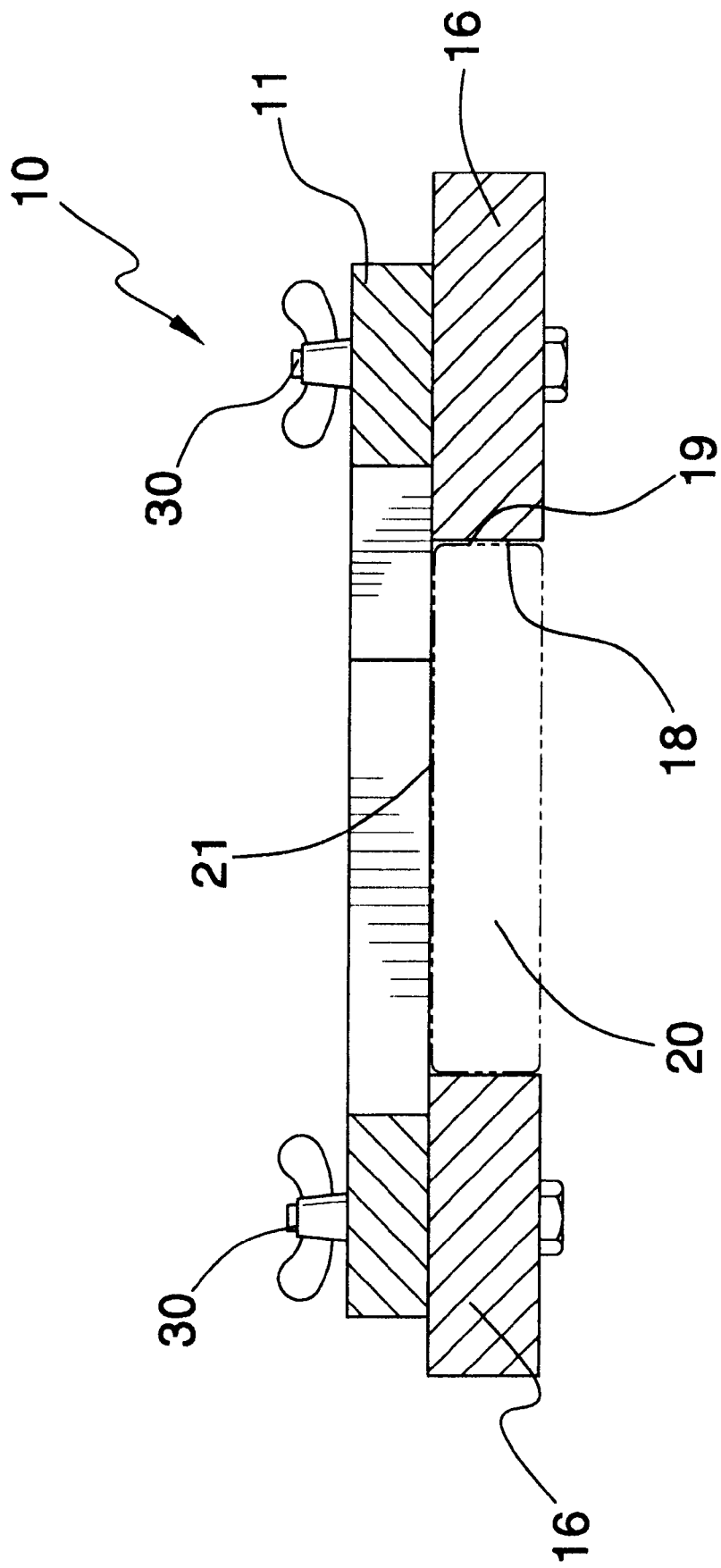
FIG. 3 is a schematic cross-sectional view of the present invention taken along sectional lines 3—3 in FIG. 1.
Figure 4:
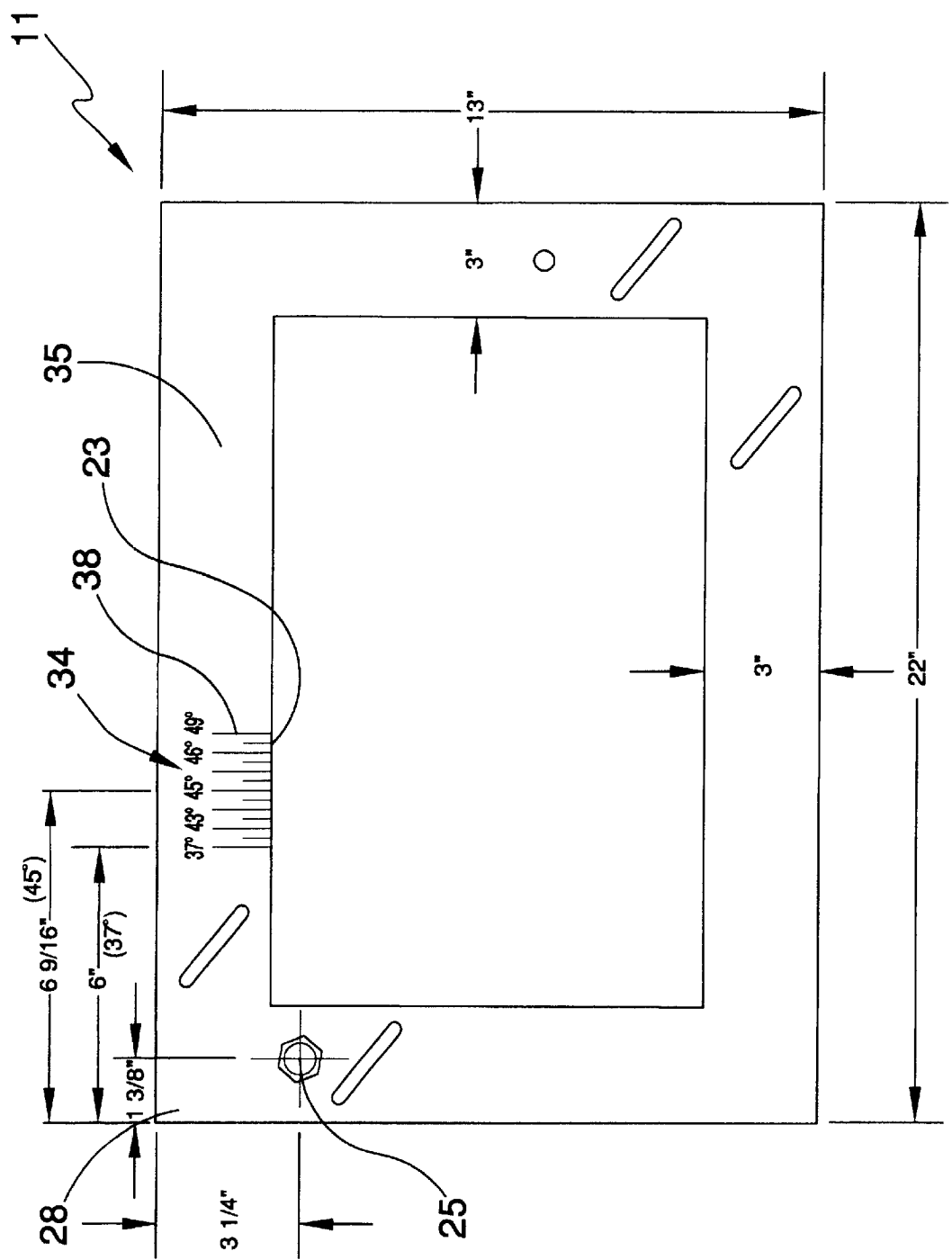
FIG. 4 is a schematic top view of the frame member of the present invention with dimensions.

With reference now to the drawings, and in particular to FIGS. 1 through 4 thereof, a new router template apparatus embodying the principles and concepts of the present invention and generally designated by the reference numeral 10 will be described.

As best illustrated in FIGS. 1 through 4, the router template apparatus 10 generally comprises a rectangular frame member 11 that has an opening 12 extending therethrough for receiving a router 13. The frame member 11 comprises a pair of elongate side portions 14 and a pair of elongate end portions 15.

A pair of brace members 16 is pivotally coupled to opposing corner portions 17 of the frame member 11. Each of the brace members 16 is oriented generally parallel to each other when attached to the frame member 11.

When inside edges 18 of the brace members 16 are positioned adjacent to side edges 19 of a stair stringer 20 and the frame member 11 is positioned atop a broad surface 21 of the stringer 20, the opening 12 guides the router 13 to facilitate cutting out a recessed section 22 in the stringer 20 such that an end portion of a stair member is positionable in the recessed section 22 to facilitate building a stairway.

Each of the portions 14, 15 of the frame member 11 has an inner edge 23, which together defines the opening 12. The inner edges 23 of the portions 14, 15 are designed for abutting a guide lip 24 of the router 13 to permit a user to cut out the recessed section 22 in the stringer 20.

A pivot member 25 pivotally couples a first of the brace members 26 to a first of the opposing corner portions 28 of the frame member 11.

The frame member 11 has a plurality of elongate slots 29 extending therethrough for receiving a plurality of fastening members 30 from each of the brace members 16. Each of the slots 29 is positioned in the opposing corner portions 17 of the frame member 11 and is oriented generally parallel to a diagonal axis extending between corresponding corners 31 of the opposing corner portions 17.

Each of the fastening members 30 of the brace members 16 is movably positionable in each of the slots 29 such that each of the brace members 16 is generally rotatable with respect to the frame member 11, and laterally positionable in a manner so as to allow a distance between the brace members 16 to be adjusted to accommodate stringers 20 having different widths.

The frame member 11 has a hole 32 for receiving a screw 33 to allow the user to secure the frame member 11 to the stringer 20 while cutting out the recessed section 22 in the stringer 20.

The frame member 11 has angle indicia 34 positioned thereon for indicating angle settings for proper orientation of the frame member 11 with regards to the stringer 20, as dictated by predetermined dimensions of the stairway the stringer 20 is to be utilized for.

The angle indicia 34 are located adjacent to an inner edge 23 of a first of the side portions 35 and are positioned between each of the end portions 15 of the frame member 11.

The first of the brace members 26 has a step indicator 36 positioned thereon. The step indicator 36 is positioned adjacent to an inside edge 18 of the first of the brace members 26. The step indicator 36 are aligned with step markings 37 made by the user along the stringer 20 to facilitate correct spacing of the stair members along the stringer 20.

The angle indicia 34 comprise a plurality of equally spaced indicator lines 38. Each of the indicator lines 38 corresponds to angles representing an angular orientation of a line taken substantially perpendicular to a longitudinal axis of the stair members with regards to a longitudinal axis of the stair stringer 20.

When one of the indicator lines 38 of the angle indicia 34 corresponding to a specific angle intersects the inside edge 18 of the first of the brace members 26, the longitudinal axis of the first of the brace members 26 and a longitudinal axis of the first of the side portions 35 are oriented at an angle that is substantially equal to the angle of the intersecting indicator line.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A router template apparatus for routing stair stringers, said apparatus comprising:
   a rectangular frame member having an opening extending therethrough for receiving a router, said frame member comprising a pair of elongate side portions and a pair of elongate end portions;
   a pair of brace members being pivotally coupled to opposing corner portions of said frame member, each of said brace members being oriented generally parallel to each other when attached to said frame member; and
   wherein when inside edges of said brace members are positioned adjacent to side edges of a stair stringer and said frame member is positioned atop a broad surface of the stringer, said opening guides the router to facilitate cutting out a recessed section in the stringer such that an end portion of a stair member is positionable in the recessed section to facilitate building a stairway.

2. The router template apparatus as set forth in claim 1, further comprising each of said portions of said frame member having an inner edge defining said opening.

3. The router template apparatus as set forth in claim 2, further comprising said inner edges of said portions of said frame member being adapted for abutting a guide lip of the router to permit a user to cut out the recessed section in the stringer.

4. The router template apparatus as set forth in claim 1, further comprising a pivot member for pivotally coupling a first of said brace members to a first of said opposing corner portions of said frame member.

5. The router template apparatus as set forth in claim 1, further comprising said frame member having a plurality of slots extending therethrough for receiving a plurality of fastening members from each of said brace members, each of said slots being positioned in said opposing corner portions of said frame member and being oriented generally parallel to a diagonal axis extending between corresponding corners of said opposing corner portions.

6. The router template apparatus as set forth in claim 5, wherein each of said fastening members of said brace members are movably positionable in each of said slots such that each of said brace members is generally rotatable with respect to said frame member and laterally positionable in a manner so as to allow a distance between said brace members to be adjusted to accommodate stringers having different widths.

7. The router template apparatus as set forth in claim 1, further comprising said frame member having a hole extending therethrough for receiving a screw to allow the user to attach said frame member to the stringer during the cutting out of the recessed section in the stringer.

8. The router template apparatus as set forth in claim 1, further comprising said frame member having angle indicia positioned thereon for indicating angle settings for proper orientation of said frame member with regards to the stringer as dictated by predetermined dimensions of the stairway the stringer is to be utilized for.

9. The router template apparatus as set forth in claim 8, further comprising said angle indicia being located adjacent to an inner edge of a first of said side portions and being positioned between each of said end portions of said frame member.

10. The router template apparatus as set forth in claim 4, further comprising said first of said brace members having a step indicator positioned thereon, said step indicator being positioned adjacent to an inside edge of said first of said brace members, wherein said step indicator is aligned with step markings made by the user along the stringer to facilitate correct spacing of the stair members along the stinger.

11. The router template apparatus as set forth in claim 8, further comprising said angle indicia comprising a plurality of equally-spaced indicator lines, each of said indicator lines corresponding to angles representing an angular orientation of a line taken substantially perpendicular to a longitudinal axis of the stair members with regards to a longitudinal axis of the stair stringer.

12. The router template apparatus as set forth in claim 11, wherein when one of said indicator lines of said angle indicia corresponding to a specific angle intersects an inside edge of a first of said brace members, the longitudinal axis of said first of said brace members and a longitudinal axis of a first of said side portions are oriented at an angle being substantially equal to the angle of said one of said indicator lines.

13. A router template apparatus for routing stair stringers, said apparatus comprising:
   a rectangular frame member having an opening extending therethrough for receiving a router, said frame member comprising a pair of elongate side portions and a pair of elongate end portions;
   a pair of brace members being pivotally coupled to opposing corner portions of said frame member, each of said brace members being oriented generally parallel to each other when attached to said frame member;

wherein when inside edges of said brace members are positioned adjacent to side edges of a stair stringer and said frame member is positioned atop a broad surface of the stringer, said opening guides the router to facilitate cutting out a recessed section in the stringer such that an end portion of a stair member is positionable in the recessed section to facilitate building a stairway;

each of said portions of said frame member having an inner edge defining said opening;

said inner edges of said portions of said frame member being adapted for abutting a guide lip of the router to permit a user to cut out the recessed section in the stringer;

a pivot member for pivotally coupling a first of said brace members to a first of said opposing corner portions of said frame member;

said frame member having a plurality of elongate slots extending therethrough for receiving a plurality of fastening members from each of said brace members, each of said slots being positioned in said opposing corner portions of said frame member and being oriented generally parallel to a diagonal axis extending between corresponding corners of said opposing corner portions;

wherein each of said fastening members of said brace members are movably positionable in each of said slots such that each of said brace members is generally rotatable with respect to said frame member and laterally positionable in a manner so as to allow a distance between said brace members to be adjusted to accommodate stringers having different widths;

said frame member having a hole extending therethrough for receiving a screw to allow the user to attach said frame member to the stringer during the cutting out of the recessed section in the stringer;

said frame member having angle indicia positioned thereon for indicating angle settings for proper orientation of said frame member with regards to the stringer as dictated by predetermined dimensions of the stairway the stringer is to be utilized for;

said angle indicia being located adjacent to said inner edge of a first of said side portions and being positioned between each of said end portions of said frame member;

said first of said brace members having a step indicator positioned thereon, said step indicator being positioned adjacent to an inside edge of said first of said brace members, wherein said step indicator is aligned with step markings made by the user along the stringer to facilitate correct spacing of the stair members along the stringer;

said angle indicia comprising a plurality of equally-spaced indicator lines, each of said indicator lines corresponding to angles representing an angular orientation of a line taken substantially perpendicular to a longitudinal axis of the stair members with regards to a longitudinal axis of the stair stringer; and wherein when one of said indicator lines of said angle indicia corresponding to a specific angle intersects said inside edge of said first of said brace members, the longitudinal axis of said first of said brace members and a longitudinal axis of said first of said side portions are oriented at an angle being substantially equal to the angle of said specific line indicator.

* * * * *